(12) United States Patent
Chang

(10) Patent No.: US 9,802,843 B2
(45) Date of Patent: Oct. 31, 2017

(54) WATER QUALITY-UPGRADING DEVICE

(71) Applicant: Yuan-Hao Chang, Taipei (TW)

(72) Inventor: Yuan-Hao Chang, Taipei (TW)

( * ) Notice: Subject to any disclaimer, the term of this patent is extended or adjusted under 35 U.S.C. 154(b) by 74 days.

(21) Appl. No.: 14/959,367

(22) Filed: Dec. 4, 2015

(65) Prior Publication Data
US 2017/0158531 A1    Jun. 8, 2017

(51) Int. Cl.
| | | |
|---|---|---|
| *C02F 1/48* | (2006.01) | |
| *C02F 1/00* | (2006.01) | |
| *B01D 35/06* | (2006.01) | |
| *B01D 35/30* | (2006.01) | |
| *B01D 39/20* | (2006.01) | |
| *B01D 29/56* | (2006.01) | |

(52) U.S. Cl.
CPC ............... *C02F 1/48* (2013.01); *B01D 29/56* (2013.01); *B01D 35/06* (2013.01); *B01D 35/30* (2013.01); *B01D 39/2072* (2013.01); *C02F 1/003* (2013.01); *C02F 1/005* (2013.01); *B01D 2201/62* (2013.01); *B01D 2239/02* (2013.01); *C02F 2307/06* (2013.01)

(58) Field of Classification Search
CPC ...... C02F 1/28; C02F 1/30; C02F 1/64; C02F 1/48
See application file for complete search history.

(56) References Cited

U.S. PATENT DOCUMENTS

| | | | | |
|---|---|---|---|---|
| 2002/0139732 A1* | 10/2002 | Shimada | ................ | A01K 63/04 |
| | | | | 210/130 |
| 2005/0191364 A1* | 9/2005 | Naito | ..................... | A61K 33/00 |
| | | | | 424/600 |
| 2007/0163943 A1* | 7/2007 | Collins | ..................... | A45F 3/20 |
| | | | | 210/335 |
| 2008/0110818 A1* | 5/2008 | Sugiura | .................. | B01D 61/14 |
| | | | | 210/321.8 |
| 2009/0084726 A1* | 4/2009 | Lee | ........................ | B01D 39/06 |
| | | | | 210/486 |

* cited by examiner

*Primary Examiner* — Walter D Griffin
*Assistant Examiner* — Cameron Allen
(74) *Attorney, Agent, or Firm* — Muncy, Geissler, Olds & Lowe, P.C.

(57) ABSTRACT

A water quality-upgrading device includes a container having an inner peripheral wall defining a receiving chamber and two opposite ends respectively defining an inlet and an outlet; at least two water molecule refinement layers disposed in the receiving chamber; two filtering sheets disposed at said inlet and said outlet of the container respectively; and wherein, when water flows into said receiving chamber, the water molecule refinement layers are capable of reducing dimension of water molecules so as to spread the finer water molecules on an oil sludge stained on a substance such that the finer water molecules penetrate into gaps formed between the oil sludge and an external surface of the substance, thereby reducing contact area amount and simultaneously weakening a bonding property between the oil sludge and the external surface of the substance to facilitate removal of the oil sludge off the substance by of a wiping cloth.

8 Claims, 14 Drawing Sheets

WATER QUALITY-UPGRADING DEVICE

BACKGROUND OF THE INVENTION

1. Field of the Invention

The present invention relates generally to filtering function of water, and more particularly a water quality-upgrading device to filter or upgrade the water quality fit for serving as drinking water.

2. The Prior Arts

We all know that water is indispensable for our daily lives, especially for maintaining the metabolism in our bodies. However, since the natural water itself contains impurity and other undesired harmful waste, it is not suitable for human use except in some circumstances. To be more specific, the natural water is unfit for human consumption, serving as drinking water. Development of late industry has contaminated the natural water in a great deal, such as discharge of industrial waste, undesired chemical and biological contaminants into the rivers and streams. In other words, the natural water is contaminated heavily with metals and is unfit for serving our daily essentials, more particularly as drinking water unless after undergoing proper refinement process.

The majority of water taps in the kitchens of our homes are installed with water filtering devices within interiors of the water outlets such that water can flow through the outlet after being filtered. It is noted that the water does not swirl within the interior of the water tap owing to rapid down flow of the water through the water tap such that the filtering device is unable to sufficiently remove the waste and chlorine which is usually added to kill certain bacteria and other microbes, thereby creating leftover of the non-solvents in the filtering device and sometimes causing breakage of the filtering device such that tiny broken pieces of the filtering device may block the water outlet of the water tap so that in the long run only a small water flow comes out slowly from the outlet of the water tap.

The applicant has, after observing the abovementioned disadvantages, felt that a device needs to be invented in order to eliminate the defects, hence leading to water quality-upgrading device of the present invention.

SUMMARY OF THE INVENTION

A primary objective of the present invention is to provide a water quality-upgrading device, in which water molecules are converted into finer water molecules (magnetized water) and in which water flow speed is reduced so as to enhance the water filtering process to provide stable water outflow.

Another objective of the present invention is to provide a water quality-upgrading device, which includes a container having an inner peripheral wall defining a receiving chamber and two opposite ends respectively defining a water inlet and a water outlet both are in spatial communication with the receiving chamber; at least one water molecule refinement layer disposed in the receiving chamber; and two filtering sheets disposed adjacent to the inlet and the outlet respectively.

Preferably, the water molecule refinement layer consists of a plurality of Far-infrared radiation emitting ceramic particles composed of Far-infrared radiation emitting ceramic material.

Preferably, the water molecule refinement layer consists of a plurality of honey comb filters fabricated from Far-infrared radiation emitting ceramic material.

Preferably, three water molecule refinement layers are disposed between the inlet and the outlet of the container in a stack manner.

Note that the water molecule refinement layers adjacent to the inlet and the outlet are fabricated from a plurality of Far-infrared radiation emitting ceramic particles, and the intermediate water molecule refinement layer is a honey comb filter fabricated from Far-infrared radiation emitting ceramic material and Far-infrared radiation emitting ceramic particles.

In one embodiment of the present invention, the water quality-upgrading device further includes an adaptor having a connection stem defining an axial through hole and an external surface formed with external threads.

In one embodiment of the present invention, at least one of the inlet or the outlet of the container has internal threads for engagement with the external threads of the connection stem of the adaptor.

In one embodiment of the present invention, the outlet of the container has internal threads for engagement with the external threads of the connection stem of the adaptor.

The water quality-upgrading device of the present invention further includes a flexible pipe connected to the outlet of the container such that the flexible pipe is exposed to an exterior of the container.

The water quality-upgrading device of the present invention further includes a cylindrical projection extending upwardly and axially from the inlet of the container. The cylindrical projection has an external surface formed with external threads. The inlet of the container has internal threads for engaging the external threads of the cylindrical projection.

The water quality-upgrading device of the present invention includes three water molecule refinement layers disposed within the receiving chamber in a stack manner such that the water molecule refinement layers adjacent to the inlet and the outlet are fabricated from a plurality of Far-infrared radiation emitting ceramic particles, and the intermediate water molecule refinement layer is a honey comb filter composed of Far-infrared radiation emitting ceramic material. When water flows into the receiving chamber of the container via the water inlet, the water molecule refinement layers are capable of converting water molecules into finer water molecules by means of the Far-infrared radiation emitting ceramic particles and the intermediate water molecule refinement layer and due to magnetic field and vibration frequency, thereby converting into finer water molecules (magnetized water). When in use, the finer water molecules on an oil sludge stained on a substance penetrate into gaps formed between the oil sludge and an external surface of the substance, thereby reducing contact area amount and simultaneously weakening a bonding property between the oil sludge and the external surface of the substance to facilitate removal of the oil sludge off the substance by means of a wiping cloth.

The plurality of the water molecule refinement layers in the water quality-upgrading device of the present invention are capable of converting water molecules into finer water molecules and simultaneously reduce the swift flowing speed, magnetized water composed of finer water molecules is resulted and is discharged from the water outlet of the container stably. At the same time, the finer water molecules possess the better penetration effect is suitable for serving as drinking water in addition to the cleaning purposes.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
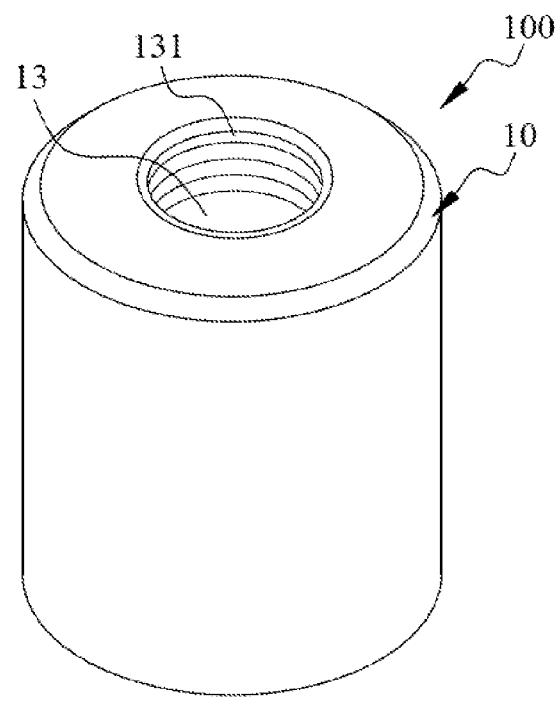
FIG. 1 is a perspective view of the first embodiment of a water quality-upgrading device of the present invention.
Figure 2:
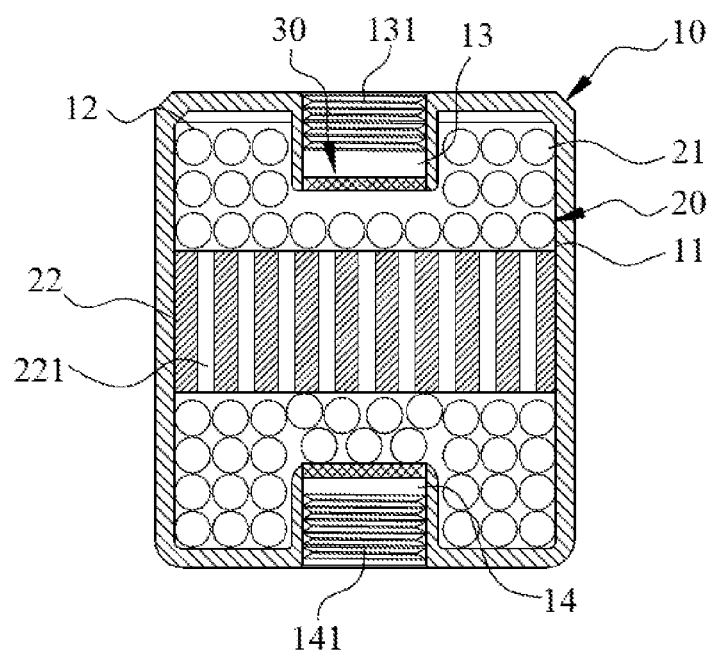
FIG. 2 is a cross-sectional view of the first embodiment of the water quality-upgrading device of the present invention.
Figure 3:
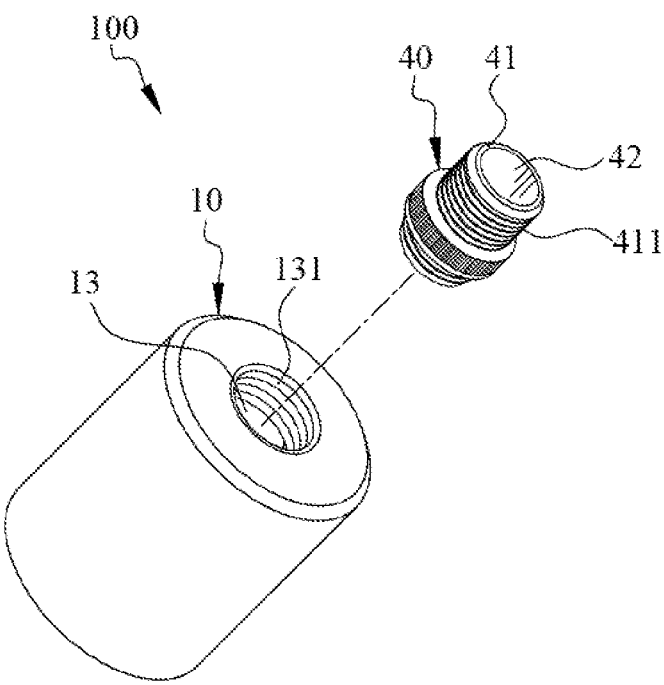
FIG. 3 is a perspective and exploded view of the first embodiment of the water quality-upgrading device of the present invention.

Referring to FIGS. 1 to 3, wherein FIG. 1 is a perspective view of the first embodiment of a water quality-upgrading device of the present invention; FIG. 2 is a cross-sectional view of the first embodiment of the water quality-upgrading device of the present invention; and FIG. 3 is a perspective and exploded view of the first embodiment of the water quality-upgrading device of the present invention. As shown, the water quality-upgrading device 100 of the present invention includes a container 10 having an inner peripheral wall 11 defining a receiving chamber 12 and two opposite ends respectively defining a water inlet 13 and a water outlet 14 both are in spatial communication with the receiving chamber 12.

In this embodiment, three water molecule refinement layers 20 are disposed in the receiving chamber 12 of the container 10 in a stack manner between the water inlet 13 and the water outlet. To be more specific, the two water molecule refinement layers 20 adjacent to the water inlet 13 and the water outlet 14 are constituted by a plurality of Far-infrared radiation emitting ceramic particles 21 while the intermediate water molecule refinement layer 20 is a honey comb filter 22 fabricated from Far-infrared radiation emitting material and have a plurality of liquid passages 221. Preferably, in this embodiment, the honey comb filter and Far-infrared radiation emitting ceramic particles are fabricated from Far-infrared radiation emitting ceramic materials.

Two filtering sheets 30 are disposed respectively at the water inlet 13 and the water outlet 14 of the container 10.

The water quality-upgrading device 100 of the present invention further includes an adaptor 40 (see FIG. 3) having a connection stem 41 that defines an axial through hole 42 and that has an external surface forming with external threads 411.

Preferably, at least one of the water inlet 13 or the water outlet 14 has internal threads 131 for engagement with the external threads 411 of the connection stem 41 of the adaptor 40 when the latter is attached threadedly to the water inlet 13 of the container 10.

In order to further understand the distinct features provided by the water quality-upgrading device of the present invention, some more explanations are provided in the following paragraphs.

Figure 4:
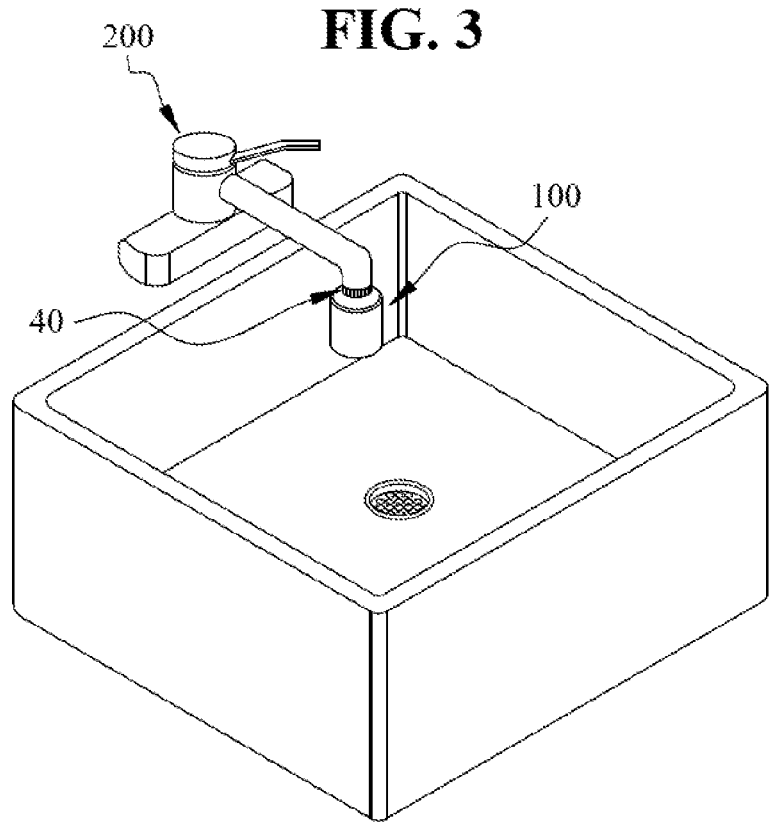
FIG. 4 illustrates the first embodiment of the water quality-upgrading device of the present invention mounted to a water tap for application.
Figure 5:
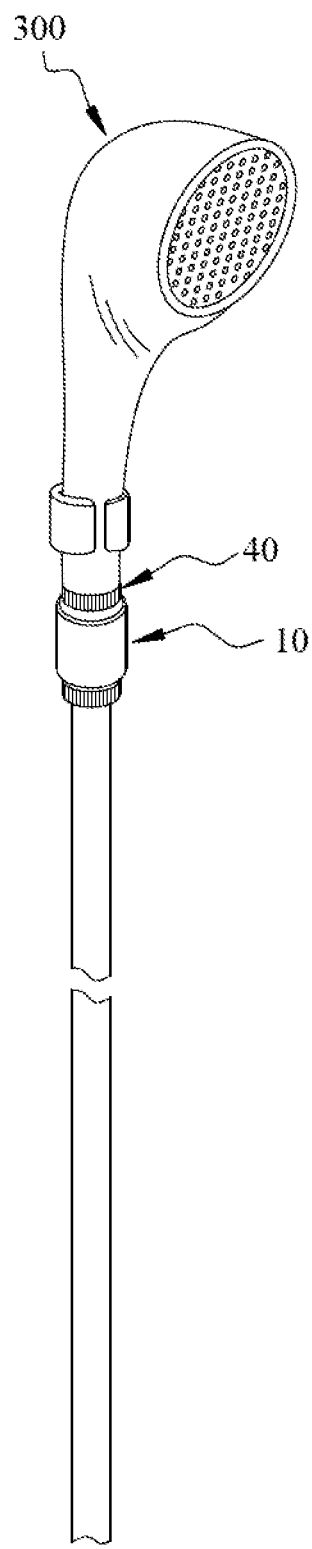
FIG. 5 illustrates the first embodiment of the water quality-upgrading device of the present invention mounted to a shower head for application.

Referring to FIGS. 4 and 5, wherein FIG. 4 illustrates the first embodiment of the water quality-upgrading device 100 of the present invention mounted to a water tap 200 for application and FIG. 5 illustrates the first embodiment of the water quality-upgrading device 100 of the present invention mounted to a shower head 300 for application. As shown, the water quality-upgrading device 100 of the present invention is coupled to the water tap 200 or the shower head 300 by fastening the connection stem 41 of the adaptor 40 such that when the water tap 200 is turned on, water flows through the through hole 42 in the adaptor 40 and the inlet 13 into the receiving chamber 12 of the container 10, wherein the water molecule refinement layers 20 adjacent to the inlet 13 and the outlet 14 converts water molecules into finer water molecules due to presence of the plurality of Far-infrared radiation emitting ceramic particles 21 and the finer water molecules flow through the intermediate water molecule refinement layer 20, which is a honey comb filter 22 fabricated from Far-infrared radiation emitting ceramic material such that the finer water molecules are treated thrice so that the water molecules penetrated through three water molecule refinement layers 20 when water is discharged finally from the water outlet 14 of the container 10. It is noted that due to passing of the water through the three water molecule refinement layers 20, the molecular beams of the water molecules are reduced to 5-6 scale which is the ideal condition, and hence the water thus filtered possesses the high soluble and penetration property.

Also note that the upper and lower water molecule refinement layers 20 are constituted by the plurality of Far-infrared radiation emitting ceramic particles 21 and thus the water flow speed and the dimension reducing time of the water molecules is prolonged and the water finally discharges from the outlet 14 of the container 10 is in the form of magnetized water, since the water molecules must pass through the magnetic field caused by the Far-infrared radiation emitting ceramic particles 21 or the honey comb filter 22, where the dimension of the water molecules are reduced due to magnetic vibration. In other words, the water discharged from the outlet 14 of the container 10 is soften after being undergone the magnetic water treatment so as to reduce the effects of hard water. It is known that the magnetized composed of finer water molecules are fit for serving as drinking water.

Figure 17:
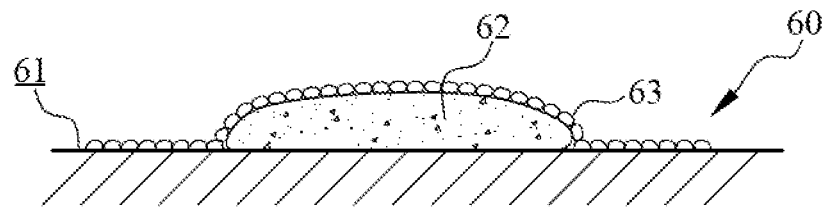
FIGS. 17-19 respectively illustrate how spilled water from a water tap installed with the water quality-upgrading device of the present invention being wiped out by a wiping cloth.
Figure 18:
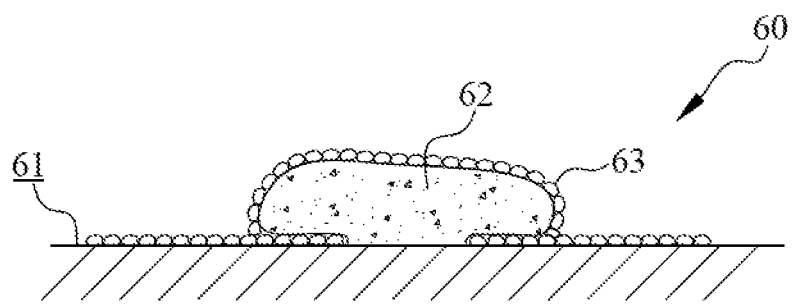
Figure 19:
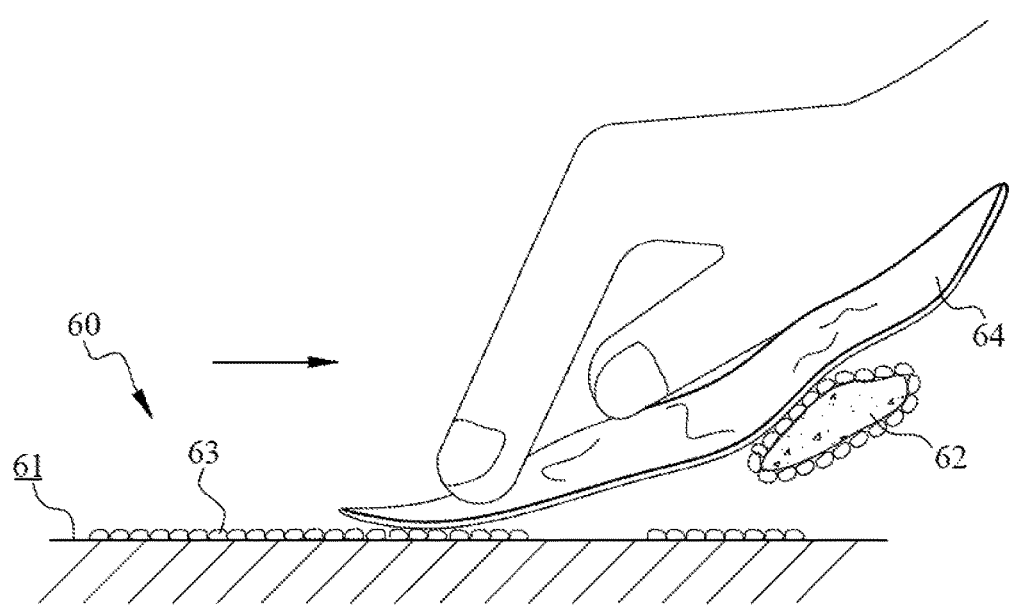

FIGS. 17-19 respectively show how some spilled water from a water tap installed with the water quality-upgrading device of the present invention being wiped out by a wiping cloth. As illustrated, in the event of removing an oil sludge 62 stained on a substance, like a floor surface, all you need to do is spread a little water discharged from the outlet 14 of the container 10 over the oil sludge 62 such that the finer water molecules 63 penetrate into gaps formed between the oil sludge 62 and an external surface 61 of the substance 60, thereby reducing contact area amount and simultaneously weakening a bonding property between the oil sludge 62 and the external surface 61 of the substance 60 to facilitate removal of the oil sludge 62 off the substance 60 by means of a wiping cloth 64. Since no chemical detergent is used for cleaning the substance 60, the ambient surrounding is not contaminated.

Regarding why the water discharged from the outlet 14 of the contained is called magnetized water, the water molecules in the container 10 must pass through the magnetic field caused by the Far-infrared radiation emitting ceramic particles 21 or Far-infrared radiation emitting ceramic material 22 of the water molecule refinement layers 20, where the dimension of the water molecules are reduced due to magnetic vibration and where the effects of regular water are reduced simultaneously, thereby refining the water. In other words, the water discharged from the outlet 14 of the container 10 is fully refined after being undergone the water treatment. It is known that the magnetized water composed of finer water molecules is fit for serving as drinking water and possesses the high soluble and penetration property.

Figure 6:
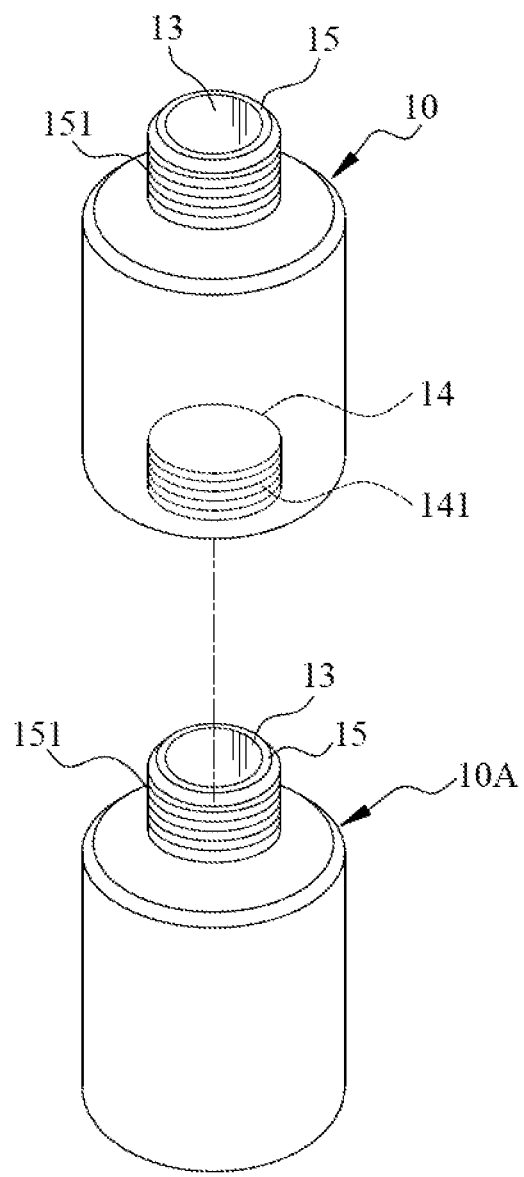
FIG. 6 is a perspective and exploded view of the second embodiment of the water quality-upgrading device of the present invention.

FIG. 6 is a perspective and exploded view of the second embodiment of the water quality-upgrading device of the present invention, wherein the water quality-upgrading device of the present invention further includes a cylindrical projection 15 extending upwardly and axially from the inlet 13 of the container 10. The cylindrical projection 15 has an external surface formed with external threads 151 while the outlet 13 of the container 10 has internal threads 141 for engaging the external threads 151 of the cylindrical projection 15. Under this condition, two units of the water quality-upgrading devices 100 of the present invention can be utilized in order to enhance water quality in a more refined manner.

Figure 7:
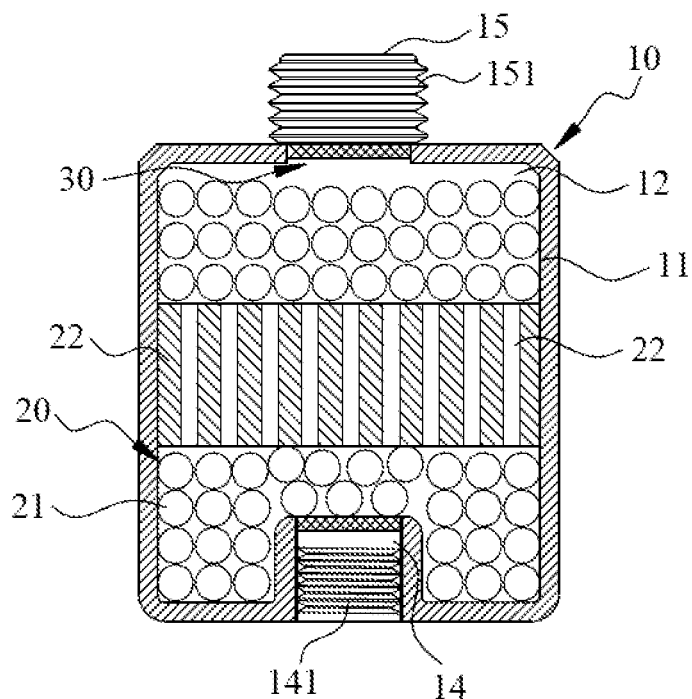
FIG. 7 is a cross-sectional view of the second embodiment of the water quality-upgrading device of the present invention in a first mode.
Figure 8:
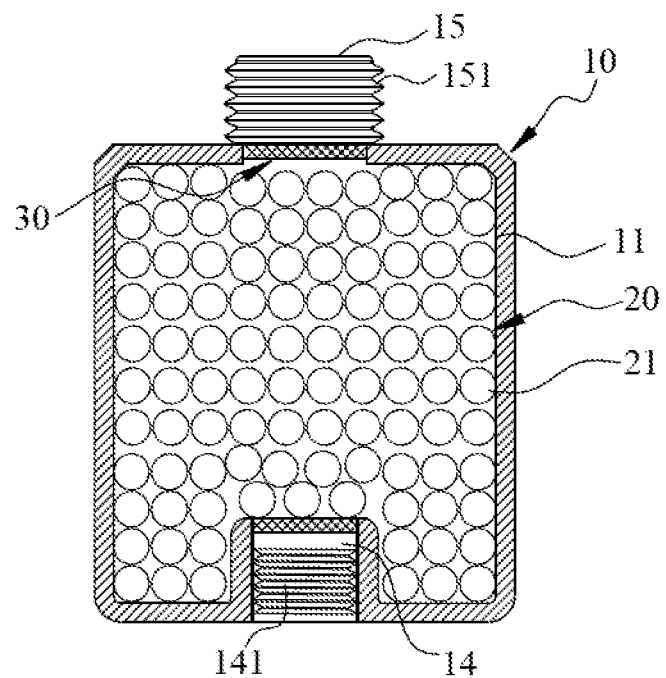
FIG. 8 is a cross-sectional view of the second embodiment of the water quality-upgrading device of the present invention in a second mode.

FIG. 7 is a cross-sectional view of the second embodiment of the water quality-upgrading device of the present invention in a first mode, wherein three water molecule refinement layers 20 are disposed within the receiving chamber 12 in a stack manner such that the water molecule refinement layers 20 adjacent to the inlet 13 and the outlet 14 are fabricated from a plurality of Far-infrared radiation emitting ceramic particles 21 while the water molecule refinement layer 20 between the inlet 13 and the outlet 14 consists of a honey comb filter 22 having a plurality of liquid passage therebetween. When water flows into the receiving chamber of the container via the water inlet 13, the water molecule refinement layers 20 are capable of reducing dimension of water molecules thrice FIG. 8 is a cross-sectional view of the second embodiment of the water quality-upgrading device of the present invention in a second mode, wherein only a single water molecule refinement layer 20 constituted by a plurality of Far-infrared radiation emitting ceramic particles 21 is disposed in the receiving chamber 12 of the container 10.

Figure 9:
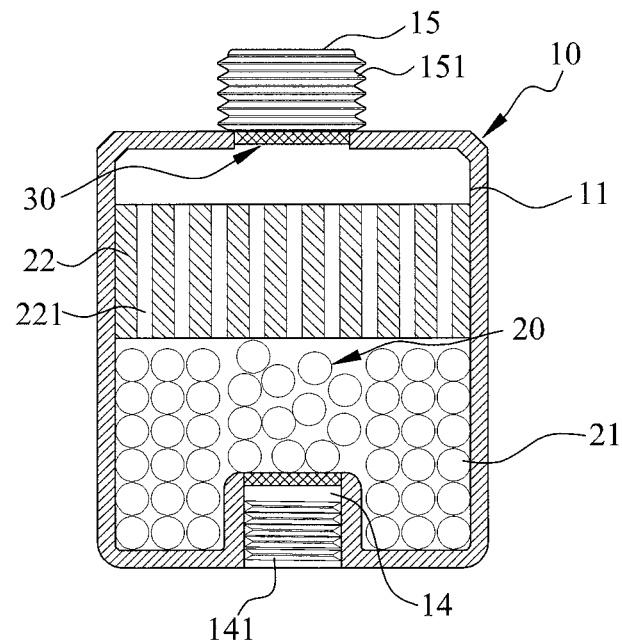
FIG. 9 is a cross-sectional view of the second embodiment of the water quality-upgrading device of the present invention in a third mode.

FIG. 9 is a cross-sectional view of the second embodiment of the water quality-upgrading device of the present invention in a third mode, wherein two water molecule refinement layers 20 are disposed in the receiving chamber 12 of the container 10. The upper water molecule refinement layer 20 is a honey comb filter 22 fabricated from Far-infrared radiation emitting ceramic material and has a plurality of liquid passages 221 therebetween while the lower water molecule refinement layer 20 is constituted a plurality of Far-infrared radiation emitting ceramic particles 21.

Figure 10:
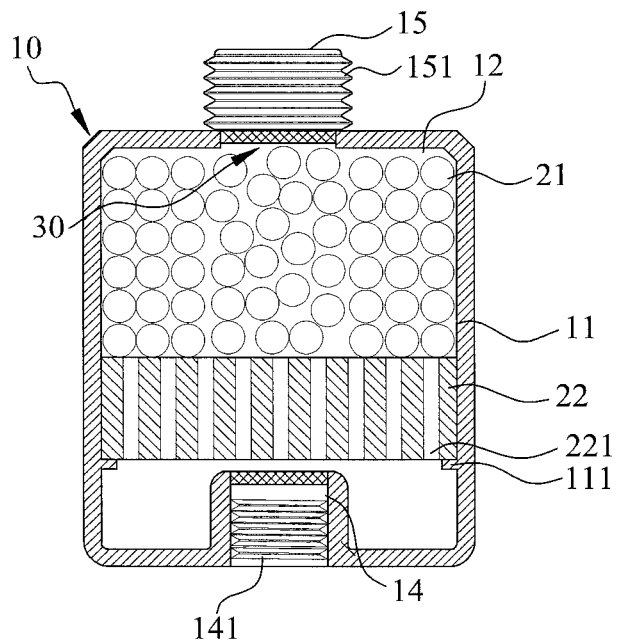
FIG. 10 is a cross-sectional view of the second embodiment of the water quality-upgrading device of the present invention in a fourth mode.

FIG. 10 is a cross-sectional view of the second embodiment of the water quality-upgrading device of the present invention in a fourth mode, wherein the only difference resides in that the arrangement of two water molecule refinement layers 20 in the receiving chamber 12 of the container 10 is transverse relative to the third mode. In this embodiment, a support member 111 in the form of an annular flange (or a plurality of stubs) protrudes from the inner peripheral wall confining the container 10 and is located above the outlet 14 such that one of the water molecule refinement layers 20 serving as a first water molecule refinement layer is disposed on the support member 111 and thus is spaced apart from the outlet 14 of the container 10 while the other one of the water molecule refinement layers 20 serving as a second water molecule refinement layer is disposed on the first water molecule refinement layer.

Figure 11:
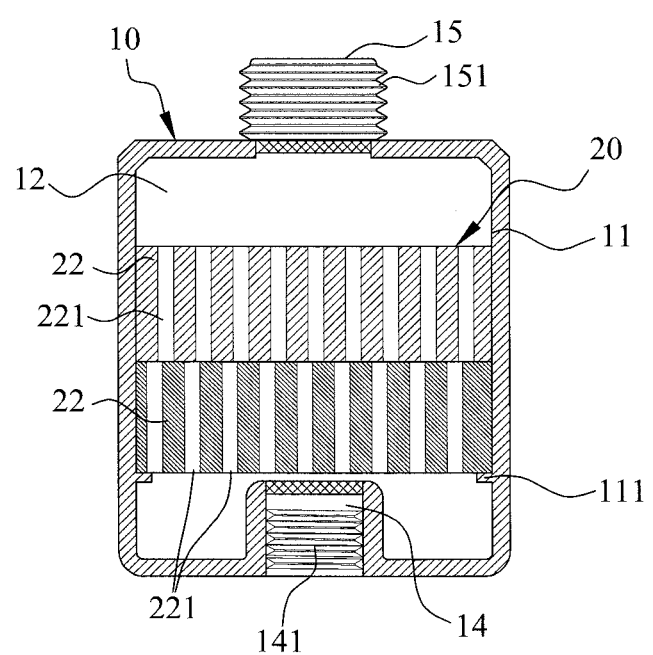
FIG. 11 is a cross-sectional view of the second embodiment of the water quality-upgrading device of the present invention in a fifth mode.

FIG. 11 is a cross-sectional view of the second embodiment of the water quality-upgrading device of the present invention in a fifth mode, wherein two water molecule refinement layers 20 are disposed in the receiving chamber 12 of the container 10. Each water molecule refinement layer 20 is respectively a honey comb filter 22 fabricated from Far-infrared radiation emitting ceramic material. Note that the liquid passages 221 in the upper water molecule refinement layer 20 are respectively aligned with the solid blocks 22 of the lower water molecule refinement layer 20. In other words, the liquid passages 221 in the upper water molecule refinement layer 20 are off set relative to the liquid passages 221 in the lower water molecule refinement layer 20 to further enhance the refining process of the water molecule in the receiving chamber 12 of the container 10. In this embodiment, a support member 111 in the form of an annular flange (or a plurality of stubs) protrudes from the inner peripheral wall confining the container 10 and is located above the outlet 14 such that one of the water molecule refinement layers 20 serving as a first water molecule refinement layer is disposed on the support member 111 and thus is spaced apart from the outlet 14 of the container 10 while the other one of the water molecule refinement layers 20 serving as a second water molecule refinement layer is disposed on the first water molecule refinement layer.

Figure 12:
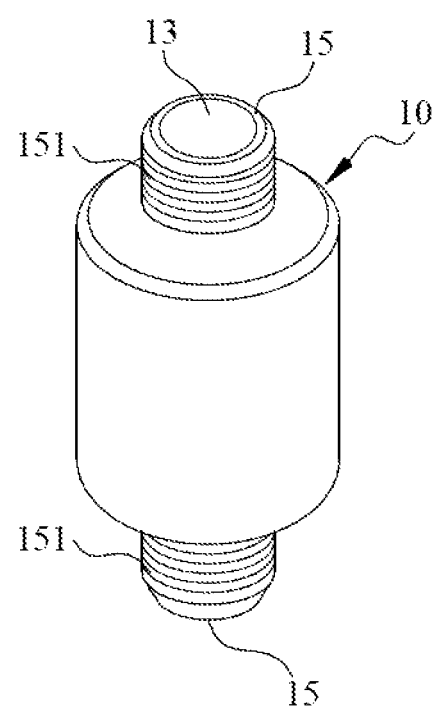
FIG. 12 is a perspective view of the third embodiment of the water quality-upgrading device of the present invention.

FIG. 12 is a perspective view of the third embodiment of the water quality-upgrading device of the present invention, wherein the third embodiment has the structure generally similar to the first embodiment shown in FIG. 6, except that the container 10 of the third embodiment has two cylindrical projections 15 extending axially and outwardly from the inlet 13 and the outlet 14 of the container 10.

Figure 13:
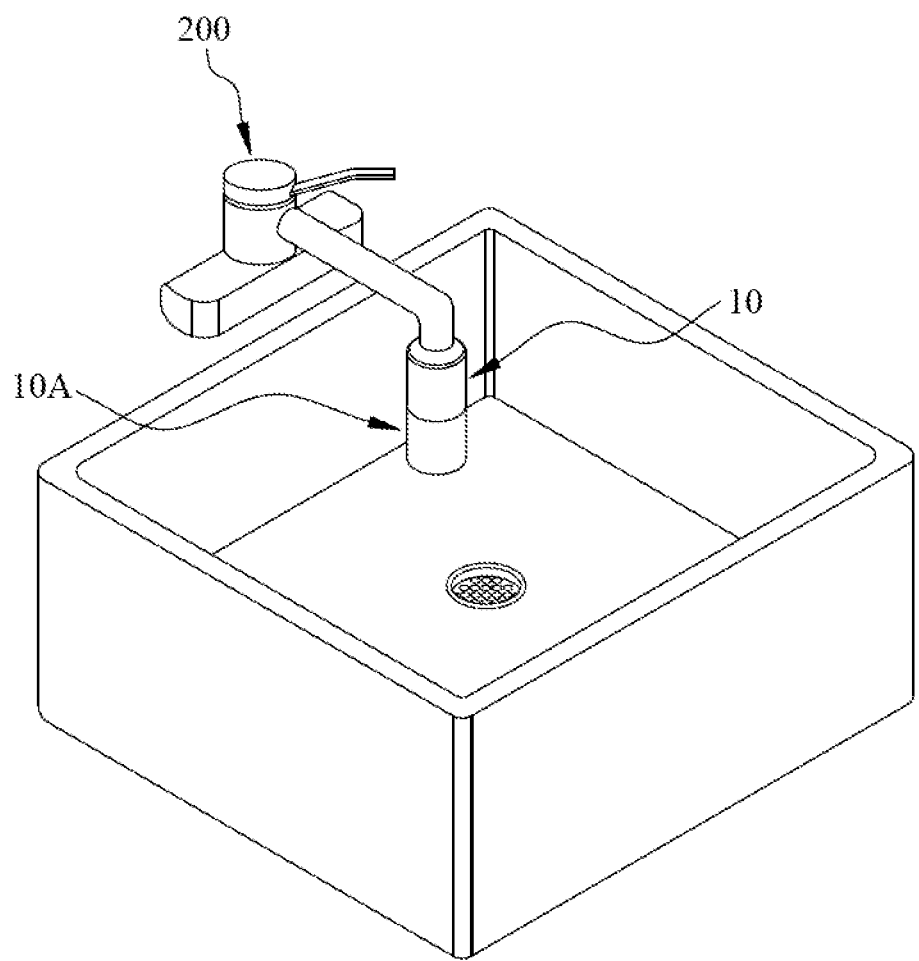
FIG. 13 illustrates the fourth embodiment of the water quality-upgrading device of the present invention mounted to a water tap for application.

FIG. 13 illustrates the fourth embodiment of the water quality-upgrading device of the present invention are mounted to a water tap 200 for application. Note that the four embodiment of the water quality-upgrading device of the present invention is constituted by one container 10 of FIG. 1 and one container 10 of FIG. 6, which is adapted to be coupled with the container 10 of FIG. 1 owing to presence of the cylindrical projection 15 in the container 10 of FIG. 6. Note that two carbon filter sheets can be disposed respectively at the inlet and outlet of the container 10A of the lower water quality-upgrading device.

Figure 14:
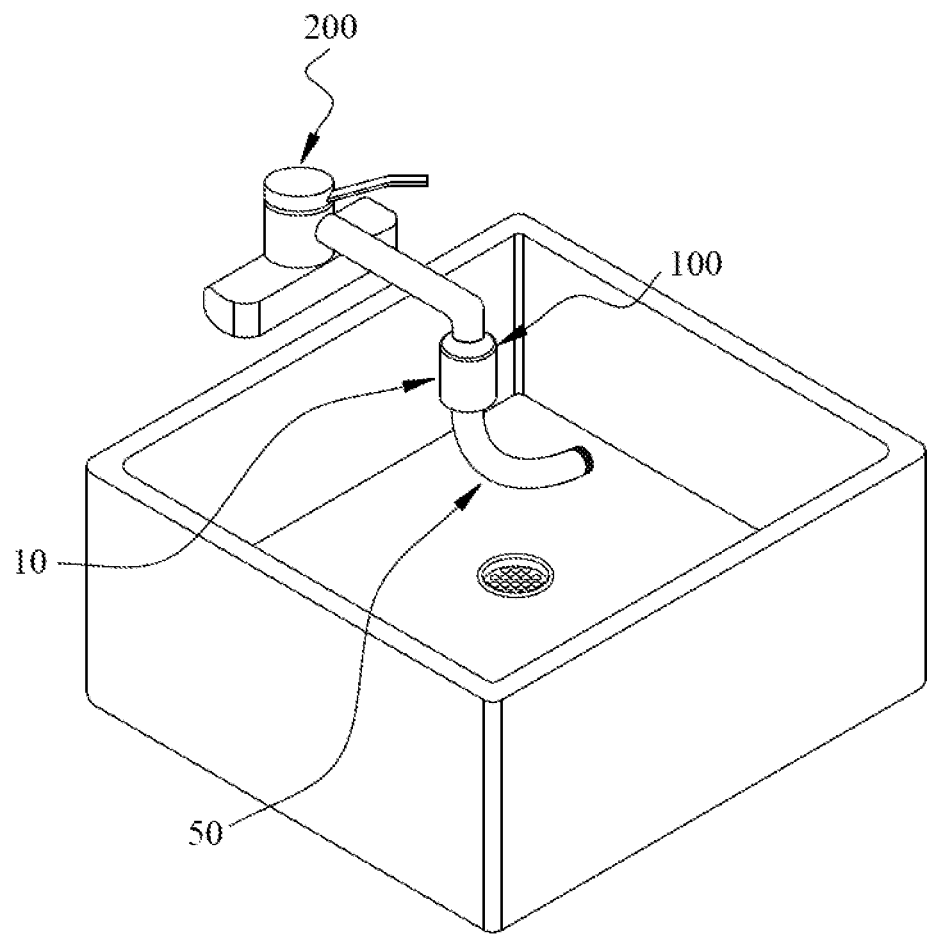
FIG. 14 illustrates the fifth embodiment of the water quality-upgrading device of the present invention mounted to a water tap for application.

FIG. 14 illustrates the fifth embodiment of the water quality-upgrading device 100 of the present invention mounted to a water tap 200 for application, wherein the fifth embodiment includes a flexible pipe 50 connected to the outlet 14 of the container 20 such that the flexible pipe 50 is exposed to an exterior of the container 10 for guiding the discharged water to a desired position in the sink.

Figure 15:
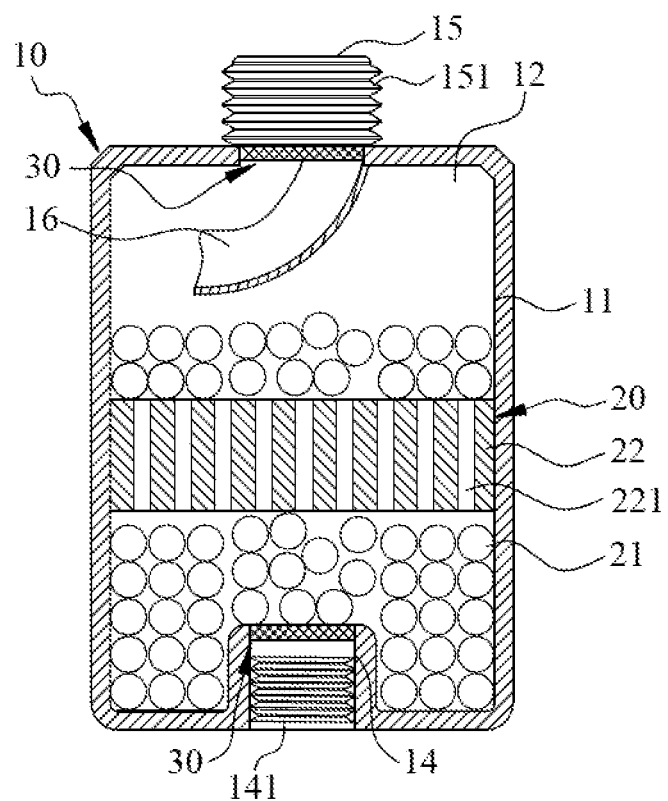
FIG. 15 is a cross-sectional view of the sixth embodiment of the water quality-upgrading device of the present invention.
Figure 16:
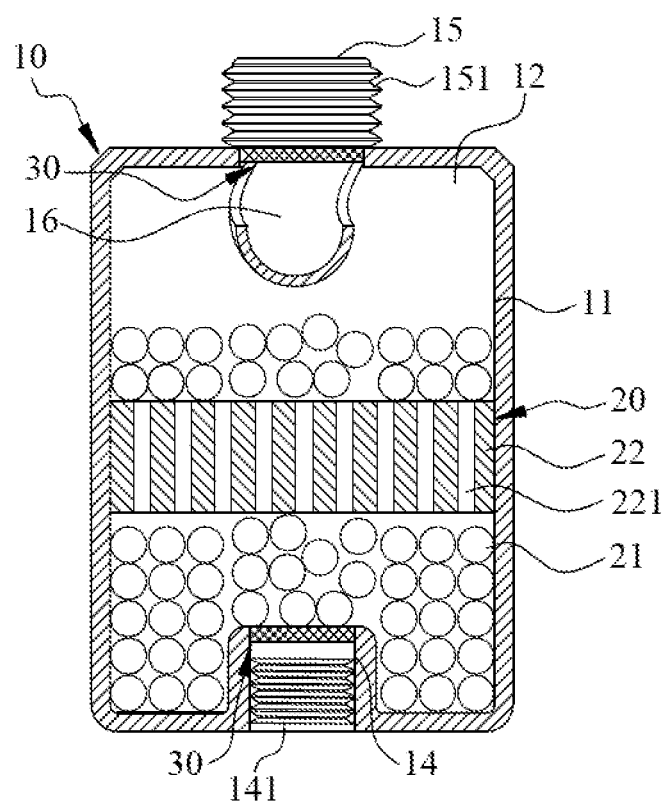
FIG. 16 is a cross-sectional view of the sixth embodiment of the water quality-upgrading device of the present invention from another angle.

Referring to FIGS. 15 and 16, wherein FIG. 15 is a cross-sectional view of the sixth embodiment of the water quality-upgrading device of the present invention while FIG. 16 is a cross-sectional view of the sixth embodiment of the water quality-upgrading device of the present invention from another angle. The sixth embodiment has the structure generally similar to the first embodiment shown in FIG. 6, except that the sixth embodiment further includes a swirl guidance element 16 in form of a pipe or plate installed at the inlet 13 for guiding water into the receiving chamber 12 of the container 10 so as to cause swirling of water flow through the water molecule refinement layers 20 in the container 10. To facilitate causing swirling of water flow before penetrating through the three water molecule refinement layers 20, the discharging end of the swirl guidance element 16 is spaced relatively apart from the topmost water molecule refinement layer 20. In other words, there should be sufficient space between the discharged end of the swirl guidance element 16 and the topmost water molecule refinement layer 20. The swirl water flow within the container 10 enhances the functions and features of reducing the dimension of water molecules when passing through the three water molecule refinement layers 20.

One thing to note is that in the sixth embodiment of the present invention, the cylindrical projection 15 is integrally formed and extends axially and outwardly from the inlet of the container 10 such that no adaptor 40 is required herein for connection with the water tap (not visible).

Another thing to note is that in addition to the Far-infrared radiation emitting ceramic particles, and Far-infrared radiation emitting ceramic material, several materials such as active carbon, bio-ceramics, biochemical ceramics, magnetized stone, tourmaline, Maifan stone, and China stone capable of glowing under ultraviolet light or a combination of any other materials can be used for fabrication of the water molecule refinement layer 20 of the present invention.

One distinct feature of the present invention resides in that when bio-ceramics, Far-infrared radiation emitting ceramic material, tourmaline and magnetized stone or any combination of these are used for fabrication of the water molecule refinement layer 20, the latter provides the following characteristics:

First, the water molecule refinement layer 20 generates negative ions after magnetization. The water discharged from the water quality-upgrading device of the present invention can adjust balance of ions in the human body, can relax the human body, enhance the human body immunity, prevents oxidation of human body in addition to delaying aging.

Second, the water discharged from the water quality-upgrading device of the present invention has a better surface activity so as to stabilize the chlorine content in the water, which in turn, prevents oxidation of minerals and enhances removal of adhesive substances from the water.

Third, when tourmaline is used for fabrication of the water molecule refinement layer 20, since tourmaline itself contains several kinds of natural minerals, some of which are greatly required for the human body. Due to electrolysis or magnetization processes, the water discharged from the water quality-upgrading device of the present invention contains those natural minerals beneficial to the human body.

Fourth, when tourmaline is used for fabrication of the water molecule refinement layer 20, since the water molecules in the water supply from the water plant has 12-16 scale but when contaminated the scale jumps upward to 35-36 such that once the tap water is passed through the water molecule refinement layer 20 of the water quality-upgrading device of the present invention, the water molecular scale is lowered to 5-6 due to presence of tourmaline having 4-14 micro magnetic wave for electrolysis. Hence, the magnetized water discharged from the water quality-upgrading device of the present invention is ideal for serving as drinking water.

To summarize the advantages provided by the water quality-upgrading device of the present invention: owing to application of three water molecule refinement layers 20 between the inlet and the outlet of the container 10, the Far-infrared radiation emitting ceramic particles 21 and the honey comb filter 22 constituting the refinement layers 20 are capable of reducing the water flow speed, the water penetration process while the dimension of the water molecules are reduced thrice due to the electrolysis and the magnetization process caused by the Far-infrared radiation emitting ceramic material. Hence the water discharged from the outlet of the container of the present invention is fit for serving as drinking water. Due to electrolysis or magnetization processes, the water discharged from the water quality-upgrading device of the present invention contains those natural minerals beneficial to the human body.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A water quality-upgrading device comprising:
   a container having an inner peripheral wall defining a receiving chamber and two opposite ends respectively defining an inlet and an outlet both are in spatial communication with the receiving chamber;
   a support member inwardly protruded from said inner peripheral wall of said container and located above said outlet;
   at least two water molecule refinement layers disposed in said receiving chamber, one of said water molecule refinement layers serving as a first water molecule refinement layer and the other one of said water molecule refinement layers serving as a second water molecule refinement layer, said first water molecule refinement layer being a honey comb filter fabricated from Far-infrared radiation emitting ceramic material and disposed on said support member, said second water molecule refinement layer being a honey comb filter fabricated from Far-infrared radiation emitting ceramic material or consisting of a plurality of Far-infrared radiation emitting ceramic particles fabricated from Far-infrared radiation emitting ceramic material and disposed on said first water molecule refinement layer;

two filtering sheets disposed at said inlet and said outlet of said container respectively; and wherein, when water flows into said receiving chamber, said water molecule refinement layers are capable of converting water into finer water molecules so as to spread said finer water molecules on an oil sludge stained on a substance such that said finer water molecules penetrate into gaps formed between the oil sludge and an external surface of the substance, thereby reducing contact area amount and simultaneously weakening a bonding property between the oil sludge and the external surface of the substance to facilitate removal of the oil sludge off the substance by means of a wiping cloth.

2. The water quality-upgrading device according to claim 1, wherein three of the water molecule refinement layers are provided between the inlet and the outlet in a stack manner.

3. The water quality-upgrading device according to claim 1, further comprising an adaptor including a connection stem defining an axial through hole and having an external surface formed with external threads.

4. The water quality-upgrading device according to claim 3, wherein at least one of the inlet and the outlet has internal threads for engagement with the external threads of the connecting stem of the adaptor.

5. The water quality-upgrading device according to claim 3, wherein the outlet has internal threads for engagement with the external threads of the connection stem of the adaptor.

6. The water quality-upgrading device according to claim 1, further comprising a flexible pipe connected to said outlet of said container such that said flexible pipe is exposed to an exterior of the container.

7. The water quality-upgrading device according to claim 1, further comprising a cylindrical projection extending upwardly and axially from the inlet of the container, the cylindrical projection having an external surface formed with external threads, the inlet having internal threads for engaging the external threads of the cylindrical projection.

8. The water quality-upgrading device according to claim 1, further comprising a swirl guidance element installed at the inlet for guiding water into the receiving chamber.

* * * * *